United States Patent
Pierce et al.

(10) Patent No.: US 8,819,483 B2
(45) Date of Patent: Aug. 26, 2014

(54) COMPUTING DEVICE WITH REDUNDANT, DISSIMILAR OPERATING SYSTEMS

(75) Inventors: James R. Pierce, Cumming, GA (US); Eric H. Walker, Suwanee, GA (US); John A. Wahl, Duluth, GA (US)

(73) Assignee: L-3 Communications Corporation, New York, NY (US)

( * ) Notice: Subject to any disclaimer, the term of this patent is extended or adjusted under 35 U.S.C. 154(b) by 2318 days.

(21) Appl. No.: 11/535,810

(22) Filed: Sep. 27, 2006

(65) Prior Publication Data

US 2008/0077943 A1  Mar. 27, 2008

(51) Int. Cl.
*G06F 11/00* (2006.01)
(52) U.S. Cl.
USPC .............................. 714/10; 714/38.1
(58) Field of Classification Search
USPC ............... 714/38; 718/100; 713/1, 2
See application file for complete search history.

(56) References Cited

U.S. PATENT DOCUMENTS

| | | | |
|---|---|---|---|
| 4,747,040 A | 5/1988 | Blanset et al. | |
| 4,946,120 A | 8/1990 | Hatcher | |
| 5,278,973 A | 1/1994 | O'Brien et al. | |
| 5,301,334 A | 4/1994 | Horiuchi | |
| 5,430,883 A | 7/1995 | Horiuchi | |
| 5,555,491 A | 9/1996 | Tao | |
| 5,632,462 A | 5/1997 | Kallas | |
| 5,673,628 A | 10/1997 | Boos | |
| 5,751,548 A | 5/1998 | Hall et al. | |
| 5,859,762 A | 1/1999 | Clark et al. | |
| 5,931,929 A | 8/1999 | Tran et al. | |
| 6,005,368 A | 12/1999 | Frame | |
| 6,113,047 A | 9/2000 | Wung et al. | |
| 6,119,184 A | 9/2000 | Takahama | |
| 6,119,237 A | 9/2000 | Cho | |
| 6,213,438 B1 | 4/2001 | Ostby et al. | |
| 6,330,669 B1 | 12/2001 | McKeeth | |
| 6,381,133 B1 | 4/2002 | Chen | |
| 6,386,413 B1 | 5/2002 | Twyford | |
| 6,585,201 B1 | 7/2003 | Reed | |
| 6,605,924 B2 | 8/2003 | Tanaka et al. | |
| 6,674,637 B2 | 1/2004 | Shin et al. | |
| 6,697,972 B1 | 2/2004 | Oshima et al. | |
| 6,711,605 B2 | 3/2004 | Sekiguchi et al. | |
| 6,715,016 B1 | 3/2004 | Ohno et al. | |
| 6,727,920 B1 | 4/2004 | Vineyard, Jr. et al. | |
| 6,742,070 B2 | 5/2004 | Fuchida | |
| 6,763,458 B1 * | 7/2004 | Watanabe et al. | 713/100 |
| 6,768,652 B2 | 7/2004 | DeLuga | |
| 6,813,145 B2 | 11/2004 | DeLuga | |
| 6,833,989 B2 | 12/2004 | Helot et al. | |
| 6,892,261 B2 | 5/2005 | Ohno et al. | |
| 6,898,076 B2 | 5/2005 | Pappalardo et al. | |
| 6,917,989 B1 | 7/2005 | Inoue | |

(Continued)

*Primary Examiner* — Philip Guyton
(74) *Attorney, Agent, or Firm* — Arthur A. Gardner; Gardner Groff Greenwald & Villanueva, P.C.

(57) ABSTRACT

The adverse impact of system abnormalities, such as crashes or other failures or problems, is minimized by switching control of a computing device from a first operating system to a second operating system in the event a system abnormality is detected. For example, if a system abnormality causes a processor system under control of the first operating system to crash, another processor system under control of a second operating system can take over. An application program that was executing under control of the first operating system when the crash or other abnormality occurred can continue functioning under control of the second operating system.

26 Claims, 3 Drawing Sheets

(56) References Cited

U.S. PATENT DOCUMENTS

| | | |
|---|---|---|
| 6,928,542 B2 | 8/2005 | Wen et al. |
| 6,961,870 B2 | 11/2005 | Chiu et al. |
| 6,996,828 B1 | 2/2006 | Kimura et al. |
| 7,068,503 B2 | 6/2006 | Kamimaki et al. |
| 7,409,536 B2 * | 8/2008 | Guo et al. .......................... 713/1 |
| 2001/0018717 A1 | 8/2001 | Shimotono |
| 2002/0143844 A1 | 10/2002 | Tsai |
| 2003/0036843 A1 * | 2/2003 | Okude et al. .................. 701/200 |
| 2003/0114941 A1 | 6/2003 | Bass et al. |
| 2003/0177276 A1 | 9/2003 | Chiu et al. |
| 2003/0198015 A1 | 10/2003 | Vogt |
| 2004/0066620 A1 | 4/2004 | Grunow et al. |
| 2004/0088465 A1 | 5/2004 | Bianchi |
| 2004/0090742 A1 | 5/2004 | Son et al. |
| 2004/0150944 A1 | 8/2004 | Byrne et al. |
| 2004/0205755 A1 * | 10/2004 | Lescouet et al. ............... 718/100 |
| 2004/0210848 A1 | 10/2004 | Vineyard, Jr. et al. |
| 2005/0047081 A1 | 3/2005 | LaPorte et al. |
| 2005/0060467 A1 | 3/2005 | Wieck |
| 2005/0111181 A1 | 5/2005 | Schlesner et al. |
| 2005/0111182 A1 | 5/2005 | Lin et al. |
| 2005/0149933 A1 | 7/2005 | Saito et al. |
| 2005/0228769 A1 * | 10/2005 | Oshima et al. ..................... 707/1 |
| 2005/0273663 A1 * | 12/2005 | Yoon ............................... 714/36 |
| 2006/0061964 A1 | 3/2006 | Cheng |
| 2006/0085584 A1 | 4/2006 | Chen et al. |
| 2006/0092605 A1 | 5/2006 | DeLuga et al. |
| 2006/0133362 A1 | 6/2006 | Stein et al. |
| 2006/0143354 A1 | 6/2006 | Tsai et al. |
| 2006/0161713 A1 | 7/2006 | Belady |
| 2008/0184274 A1 * | 7/2008 | Ohta et al. ..................... 719/319 |

* cited by examiner

COMPUTING DEVICE WITH REDUNDANT, DISSIMILAR OPERATING SYSTEMS

CROSS-REFERENCE TO RELATED APPLICATION

Co-pending U.S. patent application Ser. No. 11/535,803, filed Sep. 27, 2006, entitled "RAPID-BOOT COMPUTING DEVICE WITH DUAL OPERATING SYSTEMS," is related by subject matter.

BACKGROUND OF THE INVENTION

1. Field of the Invention

The present invention relates generally to computing systems and, more specifically, to computing devices that include redundant or parallel elements for increased reliability.

2. Description of the Related Art

Complex software systems, such as a system of application programs and other software running on a computer under control of an operating system, cannot realistically be expected to be perfectly reliable or stable. Software reliability has been defined as the probability of failure-free software operation for a specified period of time in a specified environment. Even if a system is believed to have no faults or "bugs" at a given time, adding or removing software or otherwise changing the environment in which the system operates can alter the system's reliability. Conflicts between application programs that use shared resources (e.g., memory) are considered a major system factor affecting system stability.

Reliability problems in computer systems can manifest themselves as system "crashes," where an application program or operating system stops performing as expected and fails to respond to inputs. A system prone to crashing is sometimes said to be unstable. It is widely believed that certain operating systems are inherently more reliable or stable than others. Computer systems having operating systems in the UNIX family, such as LINUX, and those having an APPLE MACINTOSH operating system (MAC OS), are widely believed to be more stable and crash less often than some others. (The term "platform" is sometimes used in the art to refer to the combination of a computer and its operating system.) Some Microsoft WINDOWS platforms have been criticized as unstable, tending to crash more often than comparable LINUX platforms, especially in the context of conflicts among application programs.

Different operating systems are susceptible in differing degrees to different stability factors. For example, a first operating system may be less susceptible to crashes due to conflicts among application programs than a second operating system, but the first operating system may be more susceptible to crashes due to viruses or other malicious software. For example, due at least in part to the popularity of Microsoft WINDOWS, unscrupulous persons have targeted more malicious software (e.g., viruses) toward it than other operating systems, such as LINUX. The contrast between WINDOWS and LINUX is intended only as an example, as each of the operating systems that is commercially available or otherwise known has its own advantages and disadvantages in comparison with the others, especially as they relate to reliability issues such as stability and susceptibility to malicious software.

Avoiding system crashes can be extremely important in instances in which, for example, the computer is being used for health or safety applications. It would be desirable in such instances to minimize the adverse impact of system failures or other reliability problems. It is to such a method and device to which the present invention is primarily directed.

SUMMARY OF THE INVENTION

The present invention relates to minimizing the impact of system abnormalities, such as crashes or other failures or problems, by switching control of a computing device from a first operating system to a second operating system in the event a system abnormality is detected. For example, if a system abnormality causes a processor system under control of the first operating system to crash, another processor system under control of a second operating system can take over. An application program that was executing under control of the first operating system when the crash or other abnormality occurred can continue functioning under control of the second operating system. In an exemplary embodiment, the invention allows an application program that controls systems in an emergency responder vehicle, such as a police, fire or emergency medical vehicle, to continue functioning after a crash or other system abnormality.

Preferably, the first operating system and second operating systems are of different types and thus are not equally susceptible to the same factors that affect system stability or reliability. For example, one operating system can be Microsoft WINDOWS, while the other operating system can be LINUX. A virus, for example, to which WINDOWS is susceptible may not affect LINUX. Whatever factor caused the WINDOWS processor system to crash may not affect the LINUX processor system, and the LINUX processor system can take over an application program that the WINDOWS processor system was executing before the event. In an emergency responder vehicle, this can mean, for example, that at least critical systems such as the lights and sirens continue to operate.

DETAILED DESCRIPTION

Figure 1:
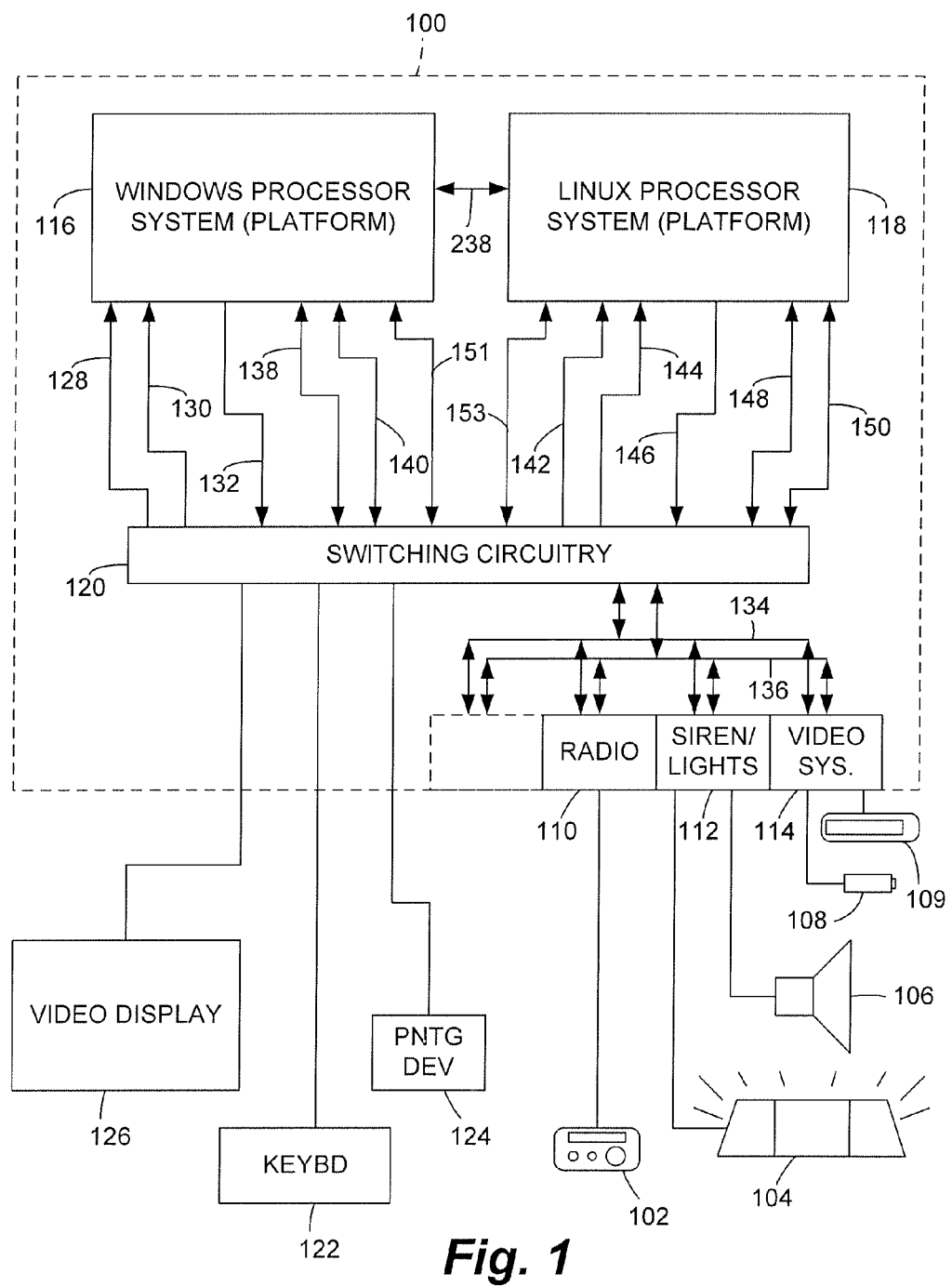
FIG. 1 is a block diagram of a system for minimizing the impact of system abnormalities in a computing device for an emergency responder vehicle, in accordance with an exemplary embodiment of the invention.

As illustrated in FIG. 1, in an exemplary embodiment of the present invention a mobile computing device 100 is used in an emergency responder vehicle, such as a police, fire or emergency medical vehicle, to control various systems associated with emergency vehicle operations, such as a radio 102, beacon light bar 104, siren 106, and a video camera 108 and associated video recorder 109. Computing device 100 includes user-removable/installable modules 110, 112, 114, etc., which control, monitor or otherwise interface with such emergency responder vehicle systems. The modular control concept is described in co-pending U.S. patent application Ser. No. 11/535,803, filed Sep. 27, 2006, entitled "MOBILE COMPUTING DEVICE WITH MODULAR EXPANSION FEATURES," the specification of which is incorporated herein in its entirety by this reference.

The modules 110, 112, 114, etc., in turn interface with first and second processor systems 116 and 118 through switching circuitry 120. Importantly, each of first and second processor systems 118 and 120 operates under a different operating system. For example, first processor system 116 can operate under the MICROSOFT WINDOWS operating system, and second processor system 118 can operate under the LINUX operating system. As a computer or processor system, together with its operating system, is sometimes referred to as a "platform," it can be said that in the exemplary embodiment of the invention first processor system 116 is a WINDOWS platform, and second processor system 118 is a LINUX platform. As described in further detail below, the use of dual platforms or processor systems 116 and 118 minimizes the impact of system abnormalities by switching control of computing device 100 from one platform to the other in the event a system abnormality is detected.

A user, such as the vehicle driver, can interact with computing device 100 through conventional user interface elements, such as a keyboard 122, pointing device 124 and video display 126. Switching circuitry 120 couples the user interface elements to the one of processor systems 116 and 118 that is controlling computing device 100. For example, when first processor system 116 is controlling computing device 100, switching circuitry 120 couples keyboard 122 to a first processor keyboard signal input 128, couples pointing device 124 to a first processor pointing device signal input 130, and couples video display 126 to a first processor video signal output 132. Similarly, when first processor system 116 is controlling computing device 100, switching circuitry 120 couples the busses 134 and 136 that serve modules 110, 112, 114, etc., to first processor busses 138 and 140. For example, busses 134 and 138 can conform to the Universal Serial Bus (USB) standard, and busses 136 and 140 can conform to the Ethernet standard. Accordingly, when second processor system 118 is controlling computing device 100, switching circuitry 120 couples keyboard 122 to a second processor keyboard signal input 142, couples pointing device 124 to a second processor pointing device signal input 144, and couples video display 126 to a second processor video signal output 146. Similarly, when second processor system 118 is controlling computing device 100, switching circuitry 120 couples the busses 134 and 136 that serve modules 110, 112, 114, etc., to corresponding second processor busses 148 and 150. First and second processor systems 116 and 118 can also include RS-232 busses 151 and 153. Although in the exemplary embodiment of the invention switching circuitry 120 is the element that couples and uncouples corresponding inputs and outputs of the first and second processor systems 116 and 118 to and from the common elements of the system, e.g., the modules and the user interface elements, any other suitable means for coupling and uncoupling signals can be used in other embodiments. The terms "circuitry" and "switching" are not intended to imply specific electrical components or methods but rather are intended to encompass all suitable arrangements.

Either or both of first and second processor systems 116 and 118 can control the switching function. For example, second processor system 118 can transmit a message to switching circuitry 120 via (e.g., RS-232) bus 153 that causes switching circuitry 120 to uncouple first processor system 116 from control of device 100 and couple second processor system 118 into control of device 100.

Figure 2:
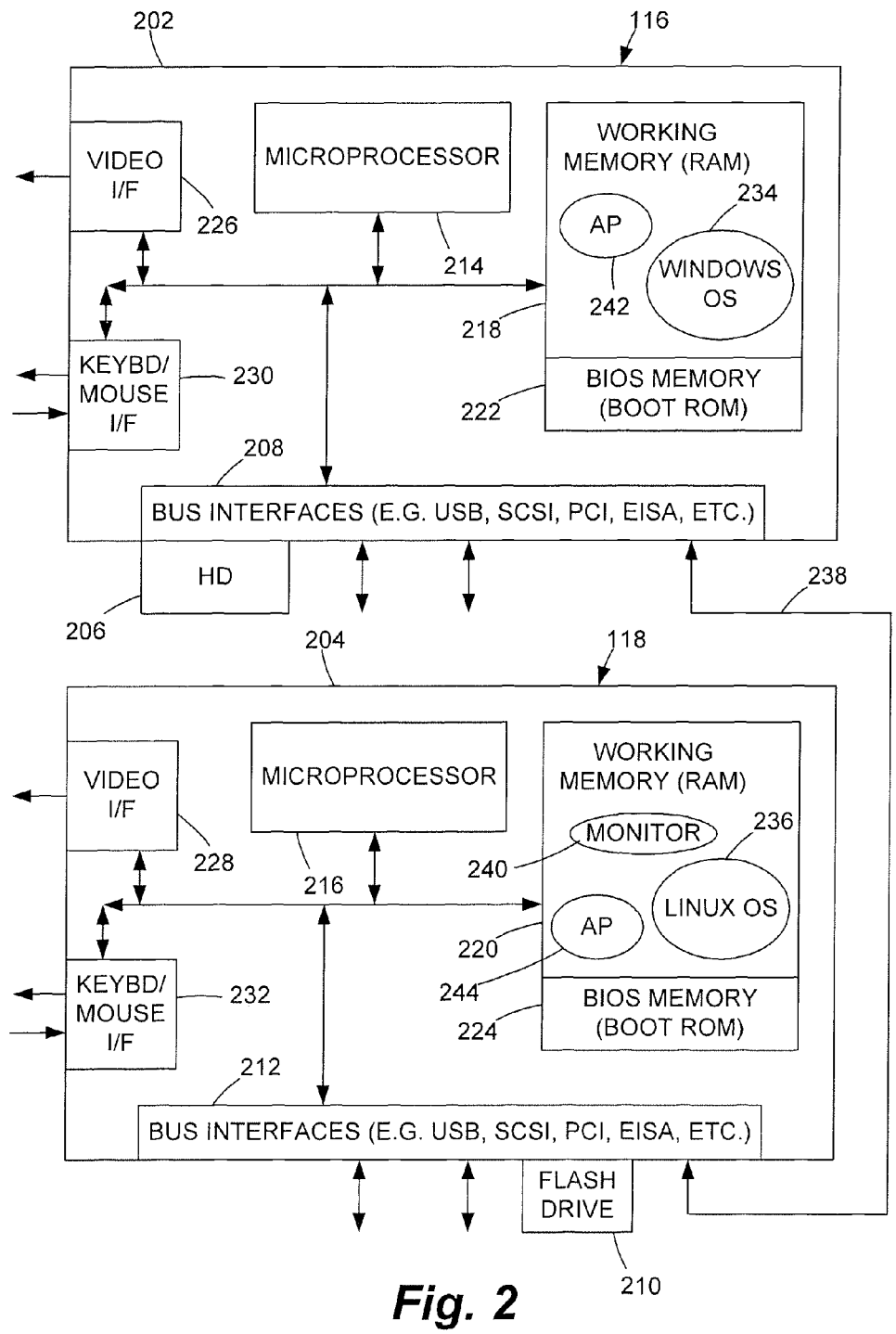
FIG. 2 is a block diagram of the dual processor systems or platforms of the system of FIG. 1.

As illustrated in FIG. 2, in the exemplary embodiment of the invention processor systems 116 and 118 comprise computer motherboards 202 and 204, respectively, of the type commonly included in personal desktop computers. Processor systems 116 and 118 can also include storage devices and other elements of the type commonly included in such computers. For example, processor system 116 includes a hard disk drive 206, which can interface with motherboard 202 through one of a number of standard bus interfaces 208 of the types commonly included in such computer motherboards (e.g., USB, SCSI, PCI, EISA, etc.). Similarly, processor system 118 can include a FLASH memory "drive" 210 that interfaces with motherboard 204 through one of a similar number of standard bus interfaces 212. (Note that FLASH memory is inherently more reliable than a disk drive.) Each of processor systems 116 and 118 has at least one processor 214 and 216, respectively, program and data working memory 218 and 220 (e.g., RAM), respectively, BIOS or boot-ROM memory 222 and 224, respectively, a video interface 226 and 228, respectively, and a keyboard/mouse interface 230 and 232, respectively. These elements are shown in FIG. 2 because they are representative of elements that are characteristic of typical, commercially available computers, but in other embodiments of the invention the processor systems can include any other suitable elements and have any other suitable architectures.

Although the WINDOWS and LINUX operating systems (i.e., software) 234 and 236 are illustrated as stored in or residing in memories 218 and 220, respectively, they are shown in this manner for purposes of illustration only, as persons skilled in the art to which the invention relates understand that such software elements are typically retrieved from non-volatile mass storage (e.g., hard drive 206 or FLASH drive 210, respectively) and executed in RAM by a respective processor 214 and 216 in portions or chunks on an as-needed basis, and may not reside in their entireties in RAM at any given time. The manner in which WINDOWS and LINUX operating systems 234 and 236 control their respective processor systems 116 and 118 is well understood by persons skilled in the art and is therefore not described herein.

Note that processor systems 116 and 118 can communicate with each other via at least one bus or signal, as indicated by the connection 238 between respective bus interfaces 208 and 212. It is through such a connection 238 that one of processor systems 116 and 118 can monitor the other and detect any abnormality in the operation of the other. For this purpose, processor system 118 can execute a monitoring application program 240, shown for purposes of illustration as residing in memory 218. Under control of monitoring application program 240 (and, ultimately, operating system 236), processor system 116 is monitored to determine if it exhibits any abnormal behavior, such as "crashing" or "hanging up," i.e., failing to respond to input. For example, monitoring application program 240 can cause processor system 118 to periodically check for activity on one or more of the busses. If it detects no activity, it can cause processor system 118 to signal switching circuitry 120 as described above. Alternatively, monitoring application program 240 can transmit a query to processor system 116. A corresponding application program (not shown) executing on processor system 116 can monitor for the query and transmit a response if it receives the query. If no response is detected, monitoring application program 240 can cause processor system 118 to signal switching circuitry 120 as described above.

The use of operating systems 234 and 236 that are not only redundant or parallel but also different from each other or dissimilar enhances reliability because operating systems 234 and 236 are generally not equally susceptible to the same factors. For example, a condition or virus that causes the WINDOWS platform (i.e., processor system 116) to crash or otherwise behave abnormally may not adversely affect the LINUX platform (i.e., processor system 118). Also, processor systems 116 and 118 may themselves have features or characteristic that affect their relative reliabilities, apart from their respective operating systems 234 and 236. For example, in the exemplary embodiment the primary non-volatile mass storage device in processor system 118 is FLASH drive 210, while the primary non-volatile mass storage device in processor system 116 is hard disk drive 206. FLASH memory is inherently more reliable than a magnetic disk because it is not as sensitive to shock and vibration.

In operation, computing device 100 may be controlling, for example, radio 102, beacon light bar 104, siren 106, and video camera 108 and recorder 109 (see FIG. 1) or other vehicle systems or performing other operations relating to the vehicle mission at the time processor system 118 detects an abnormality in the operation of processor system 116. More specifically, computing device 100 may be controlling such vehicle systems or performing such other operations via corresponding modules 110, 112, 114, etc., an application program 242, or a combination of both.

Figure 3:
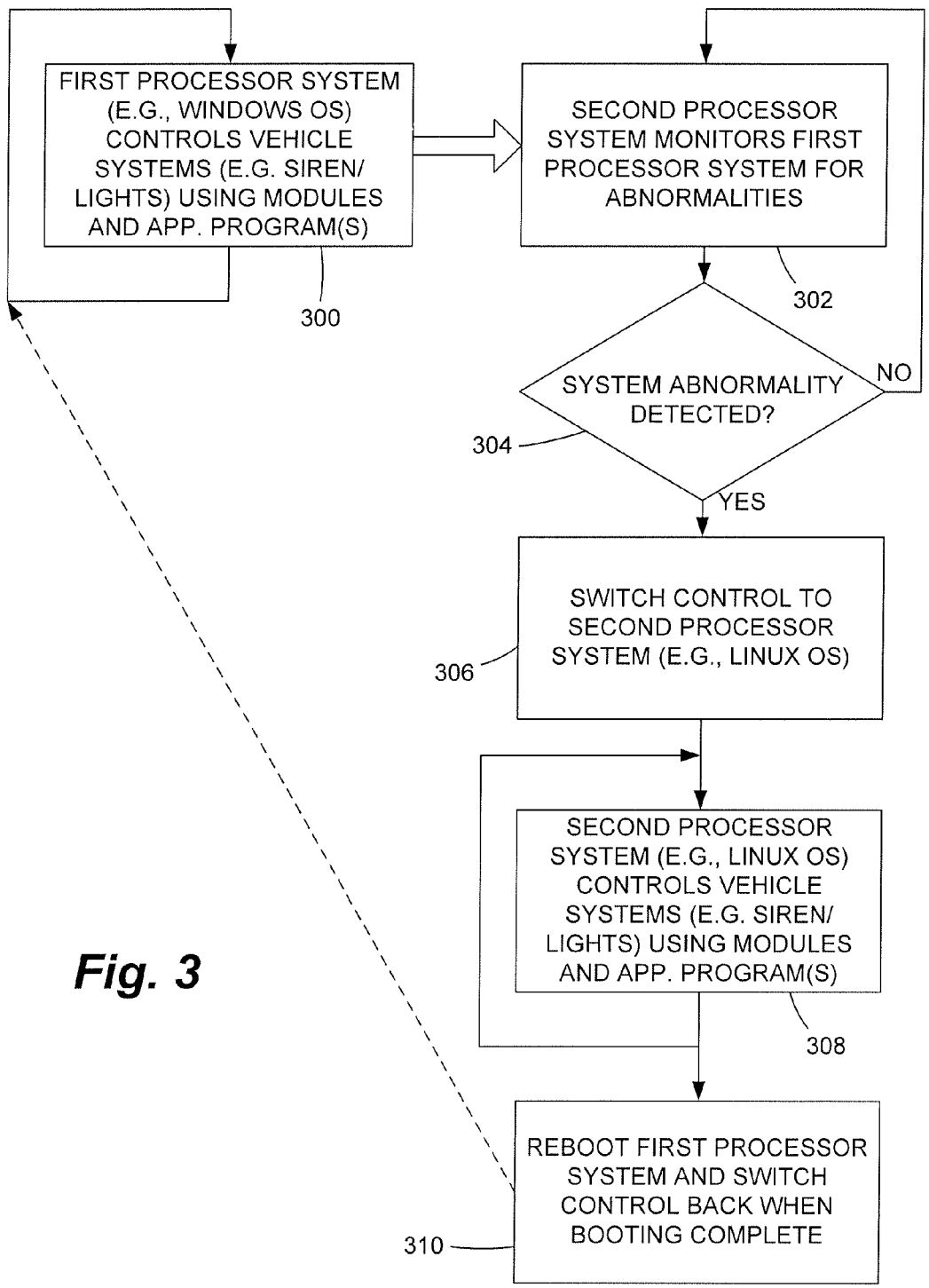
FIG. 3 is a flow diagram illustrating a method for minimizing the impact of computing system abnormalities in the system of FIG. 1.

Referring now to the flow diagram of FIG. 3, step 300 indicates such operation of computing device 100 under control of processor system 116 and its operating system 234 before an abnormality is detected. For example, the emergency responder vehicle may be enroute to the scene of an emergency, with its beacon lights flashing and siren sounding. As the continuing operation of the beacon lights and siren while enroute to the scene of an emergency can be considered of critical importance, the consequences could be disastrous if the lights and siren were to suddenly cease functioning due to a system crash or other abnormality. The driver may also be navigating to the scene by glancing at a map that is displayed, under control of a navigation application program (not shown), on video display 126, though continuing operation of that application may or may not be considered to be of as critical importance as continuing operation of the lights and siren in the event of a system crash.

Steps 302 and 304 indicate processor system 118 monitoring for and detecting an abnormality in the operation of processor system 116. Myriad events can cause a system abnormality, and the abnormality can range in severity from a nearly unnoticeable problem to a total crash of processor system 116. For example, disk drive 206 experiencing a shock as the emergency vehicle drives over a bump in the road can cause a system crash. While the emergency vehicle personnel may still be able to reach the scene without the assistance of the navigation application program and without listening to the radio, there may be some subset of operations relating to the vehicle mission, such as controlling the lights and siren, that preferably continue essentially uninterrupted.

If processor system 118 detects a system crash or other abnormality in the operation of processor system 116, then at step 306 it causes control of computing device 100 to switch to processor system 118 and its operating system 236. If application program 242 was involved in, for example, controlling the lights and siren before control was switched, then a corresponding application program 244 executing on processor system 118 can take over that involvement after control is switched at step 308, with at most an imperceptibly short interruption (e.g., on the order of milliseconds) during switching. It is contemplated that complex synchronization between such application programs and other elements during switching will not be necessary, as most operations that are important enough to ensure do not stop if processor system 116 crashes will relate to basic control functions, such as controlling the lights and siren, that do not involve precise computation or synchronization and in which interruptions of short duration would be imperceptible or harmless. Nevertheless, persons skilled in the art are capable of providing means for more precisely maintaining continuity and synchronization during switching. For example, application program 244 can be made to cause a screen (not shown) to be displayed for the user that is the same as the screen that was displayed before the switch. In any event, following switching, computing device 100 continues to operate, at least in some respects, in the same manner as it did before switching, except that it operates under control of processor system 118 and its operating system 236.

In some embodiments of the invention, a manually-operated switch (not shown) can be included that the operator can press to manually initiate the above-described processor system switchover if, for example, processor system 118 is for some reason unable to detect the abnormality in processor system 116.

After an abnormality such as a system crash and after switching has occurred in the manner described above, processor system 116 can be rebooted or otherwise caused to recover from the abnormality. For example, processor system 118 can assert a signal that causes processor system 116 to reboot, as indicated at step 310. When processor system 116 completes booting, control of computing device 100 can be restored to it, as indicated by the dashed line from step 310 to step 300, and operation can continue at step 300 as described above. Transferring control back to the first processor system 116 may be desirable in embodiments of the invention in which first processor system 116 has more capabilities than second processor system 118. For example, second processor system 118 may have only a subset of the application programs that first processor system 116. It is contemplated that a greater number of application programs that relate in some way to the emergency vehicle mission or purpose will be commercially available in a WINDOWS version than in a LINUX version. For example, processor system 116 may have the navigation application program mentioned above because it is available for WINDOWS platforms, but processor system 118 may not have that navigation application program because it is not available for LINUX platforms. Nevertheless, in other embodiments both first and second processor systems 116 and 118 can fully duplicate each other's functionality, providing completely redundant though dissimilar platforms.

It will be apparent to those skilled in the art that various modifications and variations can be made to this invention without departing from the spirit or scope of the invention. Thus, it is intended that the present invention covers the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A method for minimizing the impact of computing device abnormalities, comprising:
    detecting a system abnormality while the computing device is operating under control of a first operating system executed by a first processor system; and
    transferring control of the computing device to a second operating system executed by a second processor system in response to detection of the system abnormality, wherein the second operating system is different than the first operating system.

2. The method claimed in claim 1, further comprising the step of transferring control of the computing device back to the first operating system after the abnormality ceases to exist.

3. The method claimed in claim 2, further comprising the steps of:
   causing the first operating system to reset in response to detection of the system abnormality; and
   transferring control of the computing device back to the first operating system after the first operating system completes resetting.

4. The method claimed in claim 1, wherein:
   the step of detecting a system abnormality comprises detecting a system abnormality while the computing device is executing an application program; and
   the step of transferring control of the computing device to the second operating system comprises transferring control of execution of the application program from the first operating system to the second operating system.

5. The method claimed in claim 4, wherein the computing device comprises a mobile vehicular computing device for a motor vehicle.

6. The method claimed in claim 5, wherein the application program controls a system associated with the motor vehicle, and the step of transferring control of execution of the application program from the first operating system to the second operating system allows the application program to continue to control the system associated with the motor vehicle following detection of the system abnormality.

7. The method claimed in claim 6, wherein the system associated with the motor vehicle is a system of an emergency responder vehicle.

8. The method claimed in claim 7, wherein the system of an emergency responder vehicle is selected from the group consisting of: beacon light system; siren system; video recording system; and communication system.

9. The method claimed in claim 1, wherein the first operating system comprises WINDOWS.

10. The method claimed in claim 1, wherein the second operating system is of a UNIX operating system family.

11. The method claimed in claim 10, wherein the second operating system is LINUX.

12. The method claimed in claim 1, wherein:
    the first operating system comprises WINDOWS; and
    the second operating system comprises LINUX.

13. A computing device for minimizing the impact of system abnormalities, comprising:
    a first processor system having a first operating system;
    a second processor system having a second operating system, wherein control of the computing device is transferred from the first processor system operating under control of the first operating system to the second processor system operating under control of the second operating system in response to detection of a system abnormality, wherein the second operating system is different from the first operating system.

14. The computing device claimed in claim 13, wherein control of the computing device is transferred back to the first processor system after the system abnormality ceases to exist.

15. The computing device claimed in claim 14, wherein the first processor system reboots in response to detection of a system abnormality; and
    control of the computing device is transferred back to the first processor system after the first processor system completes rebooting.

16. The computing device claimed in claim 13, wherein control of the computing device is transferred from the first processor system to the second processor system while an application program is executing on the first processor system.

17. The computing device claimed in claim 16, wherein the computing device comprises a mobile vehicular computing device for a motor vehicle.

18. The computing device claimed in claim 17, wherein the application program controls a system associated with the motor vehicle, and transferring control of execution of the application program from the first operating system to the second operating system allows the application program to continue to control the system associated with the motor vehicle following detection of the system abnormality.

19. The computing device claimed in claim 18, wherein the system associated with the motor vehicle is a system of an emergency responder vehicle.

20. The computing device claimed in claim 19, wherein the system of an emergency responder vehicle is selected from the group consisting of: beacon light system; siren system; video recording system; and communication system.

21. The computing device claimed in claim 13, wherein the first operating system comprises WINDOWS.

22. The computing device claimed in claim 13, wherein the second operating system is of a UNIX operating system family.

23. The computing device claimed in claim 22, wherein the second operating system is LINUX.

24. The computing device claimed in claim 13, wherein:
    the first operating system comprises WINDOWS; and
    the second operating system comprises LINUX.

25. The computing device claimed in claim 13, wherein:
    the computing device comprises a mobile vehicular computing device for an emergency responder motor vehicle and controls a system associated with the emergency responder motor vehicle; and
    the system associated with the emergency responder motor vehicle is selected from the group consisting of: beacon light system; siren system; video recording system; and radio system.

26. The computing device claimed in claim 25, wherein:
    the first operating system comprises WINDOWS; and
    the second operating system comprises LINUX.

* * * * *